US008638355B2

(12) United States Patent
Eisenberg et al.

(10) Patent No.: US 8,638,355 B2
(45) Date of Patent: *Jan. 28, 2014

(54) METHOD FOR CREATING A VIDEOCONFERENCING DISPLAYED IMAGE

(75) Inventors: Aviv Eisenberg, Beer-Seva (IL); Roni Even, Tel-Aviv (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,068

(22) Filed: Jul. 10, 2012

(65) Prior Publication Data

US 2012/0274729 A1    Nov. 1, 2012

Related U.S. Application Data

(63) Continuation of application No. 11/838,404, filed on Aug. 14, 2007, now Pat. No. 8,248,455, which is a continuation-in-part of application No. 11/609,735, filed on Dec. 12, 2006, now Pat. No. 8,035,679.

(51) Int. Cl.
*H04N 7/14* (2006.01)

(52) U.S. Cl.
USPC ........................................................ 348/14.09

(58) Field of Classification Search
USPC ................. 348/14.09, 14.08, 14.03, 14.07; 370/260
See application file for complete search history.

(56) References Cited

U.S. PATENT DOCUMENTS

| | | |
|---|---|---|
| 5,896,128 A | 4/1999 | Boyer |
| 6,300,973 B1 | 10/2001 | Feder et al. |
| 6,496,216 B2 | 12/2002 | Feder et al. |
| 6,757,005 B1 | 6/2004 | Elbaz et al. |
| 7,054,820 B2 | 5/2006 | Potekhin et al. |
| 8,035,679 B2 | 10/2011 | Eisenberg et al. |
| 8,248,455 B2 * | 8/2012 | Eisenberg et al. ......... 348/14.09 |
| 2002/0188731 A1 | 12/2002 | Potekhin et al. |
| 2003/0174202 A1 | 9/2003 | Eshkoli et al. |
| 2004/0042553 A1 | 3/2004 | Elbaz et al. |
| 2005/0058088 A1 | 3/2005 | Decker et al. |
| 2005/0091380 A1 | 4/2005 | Gonen et al. |
| 2005/0264648 A1 | 12/2005 | Ivashin et al. |
| 2008/0091778 A1 | 4/2008 | Ivashin et al. |
| 2008/0136899 A1 | 6/2008 | Eisenberg et al. |

\* cited by examiner

*Primary Examiner* — Stella Woo
(74) *Attorney, Agent, or Firm* — Wong, Cabello, Lutsch, Rutherford & Brucculeri, L.L.P.

(57) ABSTRACT

A user can design their own custom composed view for a videoconference depending on the users' individualized needs. The view can include segments (windows) in which participating conferees' video images are presented and accessory elements such as window borders, text, icons, and the like. The content of the accessory elements can be linked to events within the conference or the content of other objects within the view. A custom composed view for a video conference can be designed off-line by a user, loaded into a videoconferencing device, and executed to generate the custom composed view. The videoconferencing device can synchronize the content of accessory elements with the content of other objects presented in the view.

23 Claims, 8 Drawing Sheets

FIG. 7

METHOD FOR CREATING A VIDEOCONFERENCING DISPLAYED IMAGE

CROSS-REFERENCE TO RELATED APPLICATIONS

This patent application is a continuation of U.S. patent application Ser. No. 11/838,404, filed Aug. 13, 2007, which is continuation-in-part of U.S. patent application Ser. No. 11/609,735, filed Dec. 12, 2006, the entire contents of each of which is incorporated herein by reference.

TECHNICAL FIELD

The subject matter of the present disclosure relates to the field of videoconferencing, and more specifically to designing a multipoint videoconferencing view. In particular, methods and apparatuses for designing the view displayed at a videoconferencing endpoint is described.

BACKGROUND ART

The view displayed on a monitor at a videoconferencing endpoint (EP) typically displays video images of one or more conferees and can also display one or more accessory elements. Accessory elements include text information elements, graphics elements, frames around conferees' images, line-art, etc. Some accessory elements can be created at a multipoint control unit (MCU) that controls the videoconferencing session. Such elements typically include icons such as an icon of a speaker, a display of a menu for controlling the conference, a name of a displayed conferee, frames around each of the displayed conferees, etc. In some cases the conferencing view can include video effects such as appearing and disappearing effects of images of presented conferees.

Current videoconferencing systems offer a limited variety of views. Some advanced systems offer limited flexibility to switch between views. For example, a user might be able to select a certain view from among a list of views and/or select a background from among a selection of background slides that can be used to fill areas between segments in which conferee's video images are displayed, etc. However, presently available videoconferencing systems do not allow a user to design their own customized view for a videoconferencing session. It would be advantageous for a user to have the ability to design a customized view that fits the particular needs for a particular videoconferencing session. Ideally, the user could specify the location of accessory elements, the number, size, and locations of video images, etc., as desired for a particular videoconferencing session.

SUMMARY OF INVENTION

The present disclosure provides a methods and systems for designing the view displayed at a videoconferencing endpoint. A user can design a set of layouts, select one or more background images, define windows (segments, space holders) for conferees' video images, borderlines, fonts, provide accessory elements, associate accessory elements with particular videoconferencing content, etc. Thus, the disclosure provides methods and systems for implementing custom-composed views in a videoconference.

The content of some of the accessory elements can be associated with the content of a window. Such accessory elements are referred to as associated-accessory-elements (AAE) because the accessory element is associated with particular content. For example, the content of the window can be the video image of selected (presented) conferee and the content of an AAE can be the name of the current displayed conferee in the associated window.

The view is designed using a view description file (VDF), which can be created offline and loaded to the video conferencing system. A VDF can be designed using a common drawing or graphics application such as POWERPOINT, VISIO, CORELDRAW, etc. Alternatively, a proprietary designing application having a Graphical User Interface (GUI) similar to common drawing or designing applications may be used to create the VDF.

A VDF can be parsed and processed by an MCU that conducts the videoconference. The MCU can create accessory elements and composes the composite video image with the accessory elements according to the view description file. Furthermore, the MCU matches and synchronizes the content of an AAE with the current content of its associated window. For example, the MCU matches the name of the current displayed conferee with the conferee's image.

As described in patent application Ser. No. 11/609,735, a layout or a view can be constructed in layers, which when stacked on top of each other create the view. The description of a view can implement multiple files, each describing a layer of the view. For example, a first file describing the bottom layer of a view can be processed, and then a file describing a next layer, and a next layer and so on, as the view is built up layer-by-layer. Objects appearing on a higher layer will be visible in the view in lieu of an object on a lower layer occupying the same pixel address (i.e., X-Y coordinates). In other words, objects in a higher layer will "cover up" objects in a lower layer at the same X-Y location. An object can represent a window (space holder), an accessory element, a video image, etc.

Alternatively, a view can be described by a single file, wherein objects in the layout are assigned a 'Z' value corresponding to the level of the object, for example, with a 'Z' value of zero corresponding with a first layer (numbering from the bottom up), a 'Z' value of one corresponding to the next layer, etc. When two objects share the same pixel addresses of the screen, data of a later object (i.e., higher) object is written instead of or mixed with the data of a lower object. Yet in an alternative embodiment a single file can be used having a several sections, one per each layer.

The present disclosure provides a layout (view) description file generator adapted to generate MCU VDFs. The disclosure also provides an MCU adapted to process MCU VDFs and synchronize the VDF content of AAEs and the content of their associated windows. These and other aspects of the disclosure will be apparent in view of the attached FIGs. and detailed description. In the disclosure the terms view and layout may be used interchangeably.

BRIEF DESCRIPTION OF THE DRAWINGS

Exemplary embodiments of the present invention will be more readily understood from reading the following description and by reference to the accompanying drawings, in which.

DESCRIPTION OF EMBODIMENTS

As used herein, the term endpoint refers to a terminal on a network capable of providing real-time, two-way audio/visual/data communication with other terminals or with a multipoint control unit (MCU). An endpoint may provide speech only; speech and video; or speech, data and video communications. Exemplary endpoints include Polycom VSX 7000, HDX 9004 (Polycom, Inc.). An MCU is a conference controlling entity located at a node of a network or in a terminal, which receives and processes multiple media channels from access ports according to certain criteria and distributes them to the connected channels. Examples of MCUs include the RMX 2000, MGC-100 (Polycom Inc.). Some MCUs are composed from two logical units a media controller (MC) and a media processor (MP). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website www.itu.int.

The disclosure overcomes the deficiencies mentioned in the background by allowing a user to design and compose a videoconferencing view. The user can create one or more view description files (VDF) according to his needs. An MCU can process the created VDFs and accordingly can create accessory elements and compose a composite video with conferee's video images and accessory elements according to the customized design created by the user.

The accessory elements are displayed in the appropriate time and location on the screen according to events in a conference session. A change in the location and/or the content or the shape of an accessory element can be triggered by an event in the session such as changes in which conferee is the active speaker, an additional conferee joining the conference, a conferee leaving the conference, etc.

A VDF can include text (such as names of participants, sites, etc.), description and color of each shape (such as rectangle borders frame, elliptical frame, image, etc.), coordinates and size of the shape, software code such as JavaScript, visual effects, animation, association information between accessory elements and events in the conference, etc. The VDF can be implemented at the beginning of the conferencing session during the set up stage. During the ongoing session, the VDF can be implemented each time a layout changes or each time one or more accessory elements changes, etc. An exemplary description file can be created and parsed using an appropriate parser code, etc.

A view can be composed from two or more layers stacked on top of each other and thus a VDF can contain two or more layer description files. Each layer description file can be linked to one or more other layer description files that describe associated layers that combine to compose the view. A layer can include one or more objects representing an accessory element, one or more place-holders for a video image of one or more conferees (windows), etc. Areas that are not associated with an object can be defined as a transparent area. The transparent area enables underlying objects in lower layers to be displayed in the composed view.

The description file for the first layer (from bottom up) can include information on the number of layers and can define a background slide and the link to the next layer. The background slide may cover the entire screen. The next layer can define the location of the composite video composed by the MCU conducting the communication session and a link to a next layer, if one exists.

The final (top) layer can include visible areas or objects that are placed on top of and cover objects of the previous layers. Areas of the top layer not associated to an object can be defined as transparent, allowing underlying objects to be viewed. The top layer description file may include an indication it is the top layer, i.e., it may include an end of view description file (EOVDF). Exemplary visible areas may include frames surrounding each conferee's video image, frames with the name of the site or conferee associated with each video image, menus, icons, etc. The frames with the names can be referred to as associated-accessory-elements (AAE) because the content of the accessory element (i.e., conferee's name) is associated with the content (i.e., the conferee's image) presented in the window. The AAE can be changed according to events in the session that cause the content of the window to change.

In an alternate embodiment of a view description file, each object (that defines an accessory element) can have a 'Z' parameter that is associated with the object's location and size. The 'Z' value can reflect the level of the object, for example, with a 'Z' value of zero corresponding with a first layer (numbering from the bottom up), a 'Z' value of one corresponding to the next layer, etc. An exemplary image builder, at an MCU, may first place all the objects with Z=0 in the appropriate addresses of a frame memory module, then all the objects with Z=1, etc. When two objects share the same pixel address, the higher object is written instead of the lower object. In addition, an object can include associating instructions, such as specifying that the content of the object is the name of the conferee that is currently displayed in the window. The MCU can be adapted to deliver the name of the conferee accordingly.

In yet an alternate embodiment, a single file can be used, wherein objects (elements) are written one after the other starting with objects of the first layer and terminating with objects of the last layer.

A frame memory module is a memory that stores video data associated with one or more video frames. A common frame memory module may employ two or more frame memories (current displayed frame memory, next frame memory, for example). The memories alternately store and alternately output video data of consecutive frames. Each address of a frame memory is associated with a pixel or a group of pixels on the screen.

In exemplary embodiment, a VDF can be created offline using a designing application running on a personal computer, for example. The MCU can be adapted to parse the VDF and accordingly compose a composite video stream including the accessory elements according to the instructions of the VDF. Yet in another embodiment, the MCU can be adapted to create the description file. Alternatively, the MCU can be adapted to generate information needed to create such a description file and to transfer this information to an associated server. The associated server can create one or more VDFs and can communicate them to one or more endpoints or a user's personal computer, to be selected and modified by the user. The created one or more VDFs can be communicated to one or more video output modules of an MCU. The associated server can be embedded in an MCU or can communicate with the MCU over a network.

The MCU can handle audio and video signals of one or more videoconference sessions. The received audio signals can be decoded and mixed according to the requirements of each one of the conferences. The mixed signal can be encoded and sent toward the appropriate endpoints. The received video streams can be processed by the MCU into one or more conference video streams. The conference video can be a composed video wherein received video streams at the MCU can be decoded, scaled to the appropriate size, and placed in an appropriate location (pixels in the spatial domain) in a frame memory to create a composite video. Furthermore, the MCU can be adapted to create the accessory elements and compose them together with the video images according to the VDF. In addition the MCU can be adapted to place the appropriate content in AAE according to the dynamics of the session. The composite video can be encoded and sent to the appropriate endpoint. The location and the size of images from each endpoint and the accessory elements in the composite video can be constructed according to the definitions in the description file.

In an embodiment a view description file generator (VDFG) can be used to generate one or more VDFs per each video conference session. For example, there may be a VDF per each participant endpoint.

A VDFG can create a plurality of VDFs that can describe views that cover all possible scenarios of events in a particular conference. A common video conference session can have a limited number of views based on a limited number of conference event/configurations. Each VDF can be associated with event association information. The MCU can be adapted to select the appropriate VDF based on the event.

To support the disclosed view description mechanism, an MCU can include a VDF parser and image builder for analyzing a received description file. The exemplary VDF parser and image builder can parses the VDF and creates the composite video image with the accessory elements while associating the appropriate content of AAEs. The composite video is sent and displayed on a screen at the endpoint.

The disclosure can be further understood with reference to the drawings. In the drawings like numerals represent like elements throughout the several views. For convenience, only some elements of the same group may be labeled. The drawings illustrate examples of the disclosed embodiments and are not intended to limit the disclosure in any way. Therefore, features shown in the drawings are chosen for clarity of presentation only; dimensions of components and features are chosen for clarity of presentation and are not necessarily shown to scale.

Figure 1:
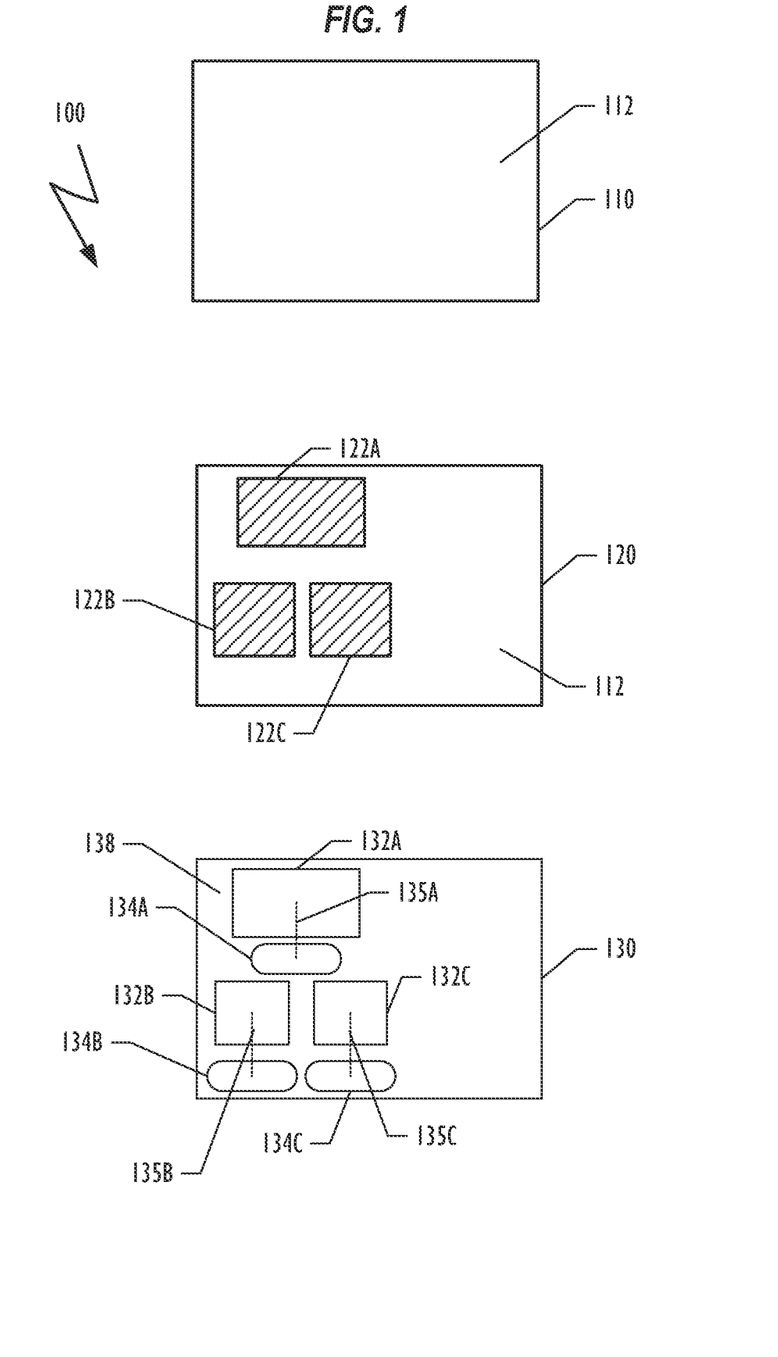
FIG. 1 is a simplified diagram schematically illustrating relevant elements of an exemplary view description file (VDF) for a video conference session.

FIG. 1 illustrates three layers 110, 120 and 130 described by an exemplary VDF 100. The VDF depicts how the view of the conference can be constructed from three layer description files linked to each other. The first layer description file can include control information relevant to the layout, such as the number of layer description files, etc. and a link to where a background slide with the image 112 can be retrieved with the size and the coordinates of the top left corner of background slide. The first layer description file can be terminated with a link to the next layer description file and a flag indicating the end of the present layer description file.

In example of layer 110 a background slide is defined 112. The top left corner of the background slide 112 can be defined as pixel 0:0 (the top left pixel of the screen) and the size can be the entire frame (e.g., 352 by 288 pixels (W×H) for CIF resolution, or 1280 by 720 pixels (W×H) for High Definition (HD 720p) resolution, etc.). Other background slides can be used, such as other images, other sizes, etc. Other first layer description files can include information on the slide and the slide itself rather than a link to the information.

The second layer description file can include links to objects such as place holders for video images (windows) rectangles 122a-c. Each object can include information such as a location (top left corner of each rectangle) and size of each rectangle 122a-c in which a conferee's video image will be displayed. In some embodiments objects 122a-c may include video effects. Exemplary video effects can include causing an image of a newly presented conferee to materialize from left to right or causing a disappearing video image to dissolve, etc. The second layer description file can be terminated with a link of the next layer description file and an indication indicating the end of the present layer description file.

The third layer description file can define the top layer of the VDF 100. The third layer description file can define a location, size, and shape of accessory elements 132a-c, 134a-c, and transparent area 138. Each accessory element can be associated with visual effects as the windows of the video images 122a-c. In FIG. 1 accessory elements 132a-c define borders that are placed over the video images areas 122a-c respectively. Elements 132a-c define rectangular shapes plotted with a line of a certain width, color and texture. Each element 132a-c can match the location and the size of its respective video image area 122a-c.

Elements 134a-c are exemplary associated accessory elements (AAE). The AAEs 134a-c define rounded rectangular shapes filled with a particular color area and including text that is relevant to its associate video image 122a-c, respectively. The relevant text can be the name of the conferee who's image is displayed in the corresponding area 122a-c, the name of the site, the type of the endpoint, or any combination these types of data, for example. The association between the contents is marked by the dotted lines 135a-c respectively. The font, color and size of the letters can be defined while creating the VDF.

According to one embodiment a text box can be associated with an event in the conference. For example, a text box can display the name of presented conferee, a name of an audio conferee that has joined the conference, a name of a speaker audio conferee, etc.

The remainder of the 3rd layer describes the transparent area 138. The third layer description file can be terminated with an indication indicating the end of the VDF.

Any number of layers, accessory elements, video images, etc., can be used. Alternatively, the disclosed method can be implemented using one file wherein the objects are assigned a 'Z' value associated with the object's coordinates and size and reflect the level (i.e., bottom to top "layer") of the object. According to this embodiment, layout 100 corresponds to a single description file that includes all elements 110 to 134, each element having a level ('Z') value. Element 112 will have a level value of zero (Z=0), for example. Elements 122a-c can have a level value of one (Z=1) and elements 132a-c and 134a-c can have a level value of two (Z=2).

An image builder can first fetch objects that have level value of zero and place those objects in the relevant location in the builder's frame memory. To generate the layout of FIG. 1 the builder first fetches the background slide 112 having a 'Z' value of zero and be places background slide 112 in the frame memory. Then objects with the level value one (objects 122a-c) are fetched and processed. The builder can use the coordinates and size of elements 122a-c for fetching video data from pixels in the frame memory coming from the decoder of the input modules that are associated with the presented conferees that are equivalent to the pixels of 122a-c. The fetched video data is written over the data of the background slide 112. After placing the last video data associated with element 122c, objects with level value (Z) of 2 (objects 132a-c, 134a-c) are searched and processed. Per each object, a shape with or without text is generated according to the instructions associated with the object and the data is written in the appropriate location (pixels) of the frame memory of the Image builder. The relevant data (the associated data) matches the terminal that is associated to the input module that delivers the decoded video data placed in windows 122a-c.

Figure 2:
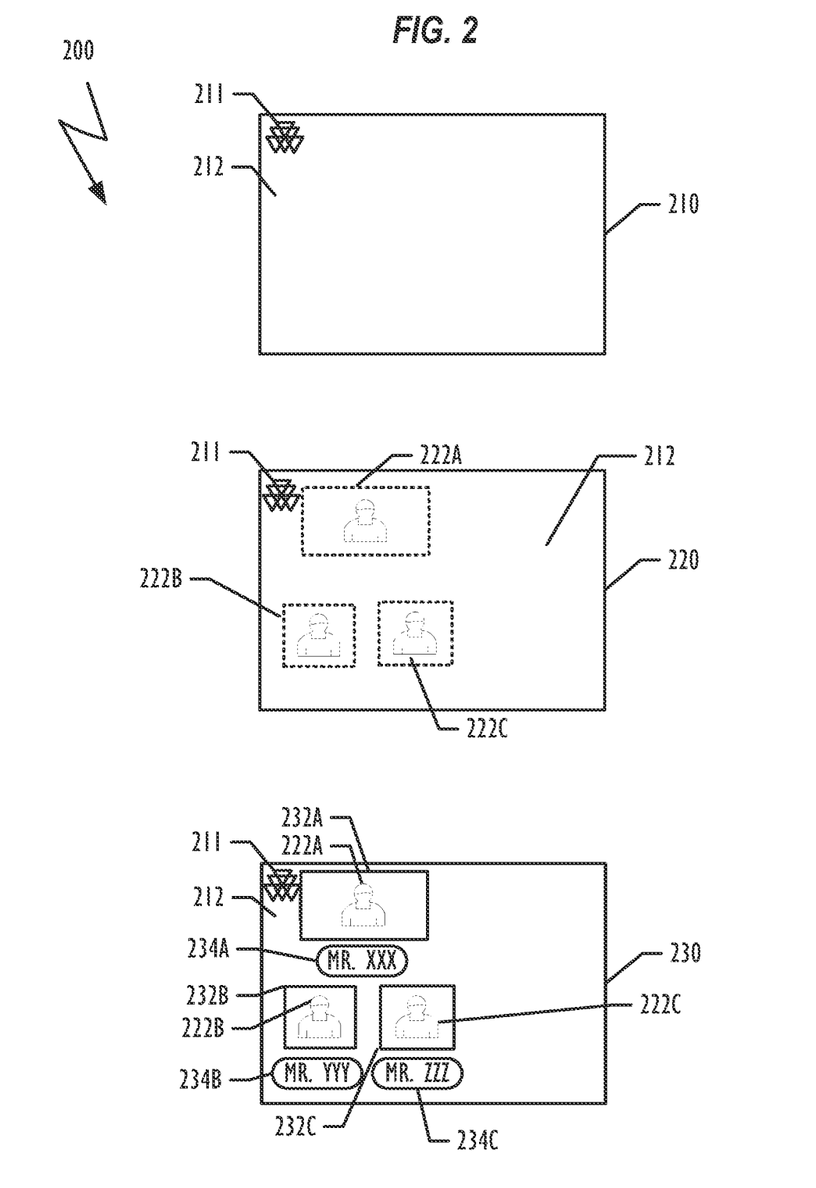
FIG. 2 is a simplified diagram of snapshots of a frame memory of a an image builder during preparing the next frame memory.

FIG. 2 illustrates a frame memory 200 of an exemplary image builder preparing a next frame memory before the frame memory is encoded and sent toward an associated endpoint. By way of example, three phases of preparing the next frame memory are illustrated: 210, 220, and 230. Phase 210 illustrates the next frame memory after storing the data of a background slide 212. The background slide 212 can include a logo of a company 211 and a background flat color, for example. Phase 220 illustrates the next frame memory after adding and storing presented conferee's video image data 222a-c. The presented conferee's video image data 222a-c is received from the decoder frame memory from addresses associated with pixels or groups of pixels equivalent to the pixels/group of pixels of area 122a-c respectively (FIG. 1). The decoder belongs to the input module that is associated with the presented conferee. The conferees' video image data 222a-c replaces or is placed on top of the data of the background slide 212.

Phase 230 illustrates the next frame memory at the end of placing the data of the accessory elements 232a-c and 234a-c. The pixels values of borders 232a-c are created and placed in the next frame memory in pixels or group of pixels defined by objects 132a-c respectively (FIG. 1). The pixels value of borders 232a-c replace or are placed on top of, or are mixed with the data of the background slide 212 of phase 210 and/or the data of the conferees' video image 222a-c of phase 220. The content of the AAEs 234a-c, the name of the presented conferee (according to the dotted line 135a-c FIG. 1), is delivered from the module that selects the presented conferees. The pixel values for the names areas 234a-c are created and placed in the next frame memory in pixels or groups of pixels defined by objects 134a-c respectively (FIG. 1). The content of objects 234a-c replace or are placed on top of the data of the background slide 212. The next frame memory is then ready to be displayed and the image builder may start preparing the consecutive next frame memory.

Figure 3:
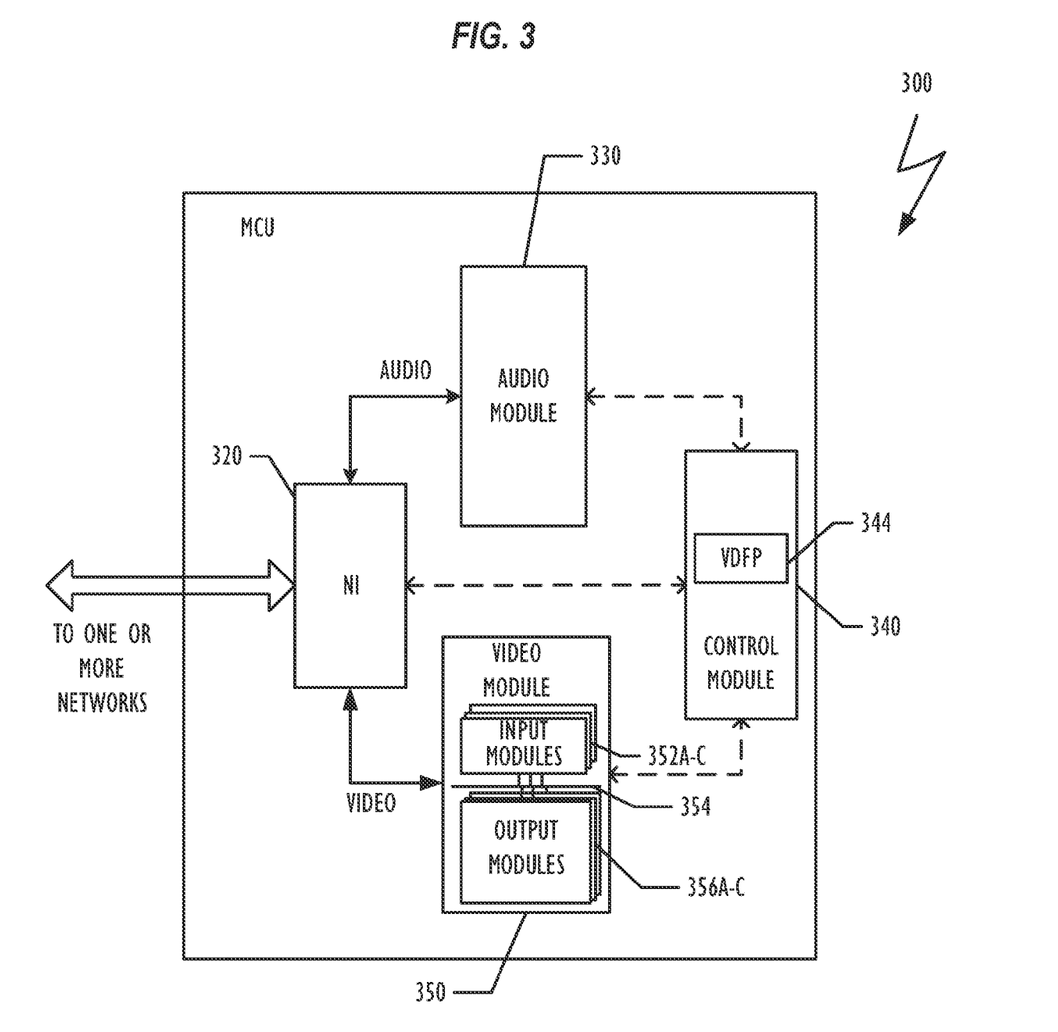
FIG. 3 is a simple block diagram illustrating relevant elements of an MCU.

FIG. 3 illustrates an MCU 300 implementing aspects of the disclosed methods. MCU 300 includes a network interface (NI) 320, an audio module 330, a control module 340, and a video module 350. Alternatively, a decomposed MCU can be used, wherein the audio module 330, the video module 350, and a part of the NI 320 can be embedded within a media processor (MP). The control module 340 and another part of the NI 320 can be embedded within a media controller (MC). The MC can control one or more MPs.

The network interface 320 receives communications from a plurality of endpoints via relevant networks and processes the communications according to one or more of a variety of communication standards. Network interface 320 can receive and transmit control and data information to/from one or more VDF generator servers (not shown). The communication can be based on an IP protocol, for example. More information concerning communication between endpoints and/or MCUs over different networks and information describing signaling, control, compression, and how to set a video call, etc., can be found in the International Telecommunication Union ("ITU") standards H.320, H.321, H.323, SIP, H.261, H.263 and H.264.

Video module 350 receives compressed video from the plurality of endpoints associated with the MCU 300 via NI 320. The video module 350 can create one or more composite compressed video streams according to one or more VDFs associated with one or more conferences currently being conducted by the MCU 300. The received compressed video input streams are processed, composed with accessory elements, and encoded by the video module 350. An exemplary video module 350 can have a plurality of input modules 352a-c, output modules 356a-c, and a common interface 354. Each input module 352a-c as well as each output module 356a-c can be associated with one or more endpoints.

Figure 5:
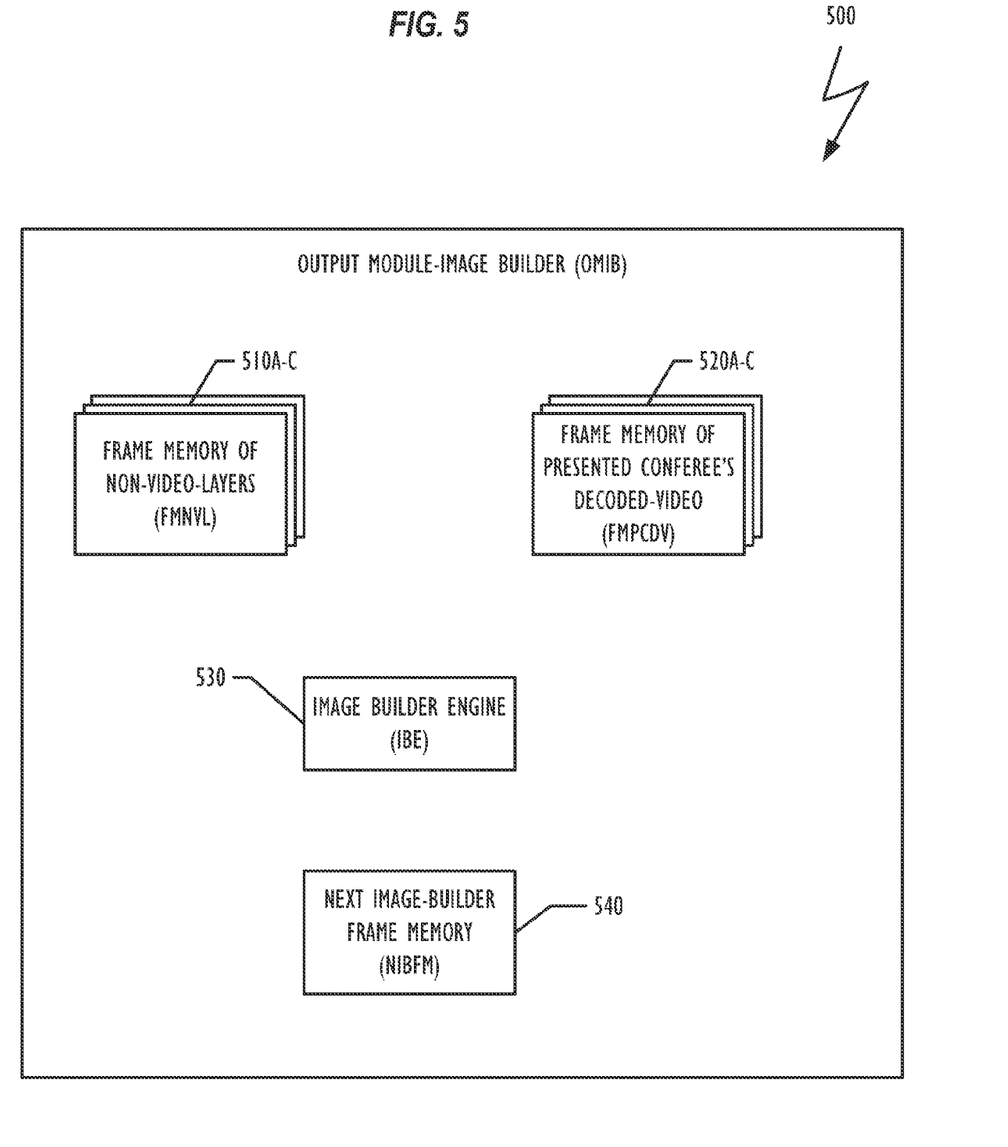
FIG. 5 is a block diagram illustrating elements of an exemplary MCU output module-image builder (OMIB)

A video output module 356a-c can be adapted to include an extended editor having features for creating the accessory elements and composing them with the video images of the presented conferees. Such an editor can be referred as image builder. More information on the operation of an exemplary image builder of an output module of an MCU is disclosed below in association with an image builder (FIG. 5).

Audio module 330 receives, via the audio line, compressed audio streams from the plurality of endpoints via NI 320. The audio module 330 processes and mixes the compressed audio streams and sends a compressed mixed signal via the audio line back to NI 320, which sends the audio to the endpoints. Audio streams sent to different endpoints can be different. For example, they can be formatted according to different communications standards matching to the needs of the individual endpoints. Also, the audio stream may not include the voice of a user associated with the endpoint to which the audio stream is sent, but that voice may be included in all other audio streams.

Audio module 330 can be adapted to analyze the received audio signals from the endpoints and determine the audio signal energy of each endpoint. Information on the signal energy can be transferred to the control module 340. The energy level can be used as a selection parameter for selecting appropriate one or more endpoints as the source for the mixing of the video of the conference, referred as "presented endpoints."

The control module 340 can be a logic unit that controls the operation of the MCU 300. In addition to common operations of a typical MCU, MCU 300 is capable of additional operations as result of having control module 340. Specifically, the control module 340 includes a logical module for parsing a received VDF, i.e., a VDF parser (VDFP) 344. In some embodiments a VDFP 344 can be part of an output module 356a-c. In such an embodiment the VDFP can be part of the image builder. Furthermore, control module 340 can be capable of receiving an indication about events that occur during the conference. Exemplary events can be a new speaker, a conferee leaving the conference, a new conferee joining the conference, etc. The information can include the session ID, endpoint ID, information on the endpoint, etc. The information can include the content of relevant AAE such as the names of the conferees associated with the event.

VDFP 344 can receive one or more VDFs relevant to a current session and parse the received VDFs. Based on the parsed VDFs the VDFP 344 determines how many CP layouts are needed and what type of composed video to generate per each endpoint involved in the session. More information on the operation of VDFP 344 is depicted below in conjunction with FIGS. 4*b* and 7.

More information on how an MCU receives, decodes, scales, composes two or more decoded video streams, and/or composes decoded streams into one or more composite video of a CP conference is disclosed in U.S. Pat. Nos. 6,300,973; 6,496,216; 6,757,005 and 7,054,820 and in U.S. patent application Ser. Nos. 09/852,438; 10/344,792; and 10/346,306, the contents of which are incorporate herein by reference.

Figure 4A:
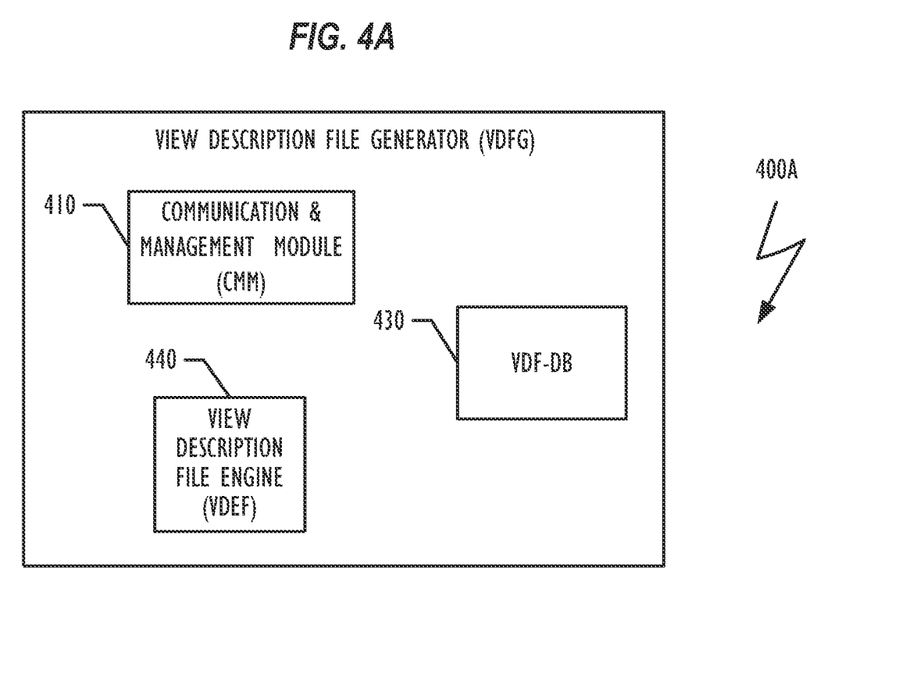
FIG. 4a is a block diagram illustrating relevant elements of an exemplary VDF Generator (VDFG)

FIG. 4*a* is a simple block diagram illustrating a VDF Generator (VDFG) 400*a*. VDFG 400*a* can be embedded within an MCU (not shown in the drawings) as a section of the control module 340 (FIG. 3). Alternatively, VDFG 400*a* can be a server, on a network, communicating with a plurality of endpoints and with one or more MCUs via the network. Still alternatively, the VDFG can be a view design application running on a computer of a user of video conferencing system. Communication with VDFG 400*a* can be via a network based on Internet Protocol (IP), for example. Still alternatively, VDFG 400*a* can be embedded within a management entity (e.g., a management server) such as used for reserving a conference session, initiating an impromptu conference, defining a conference profile, monitoring and controlling videoconferences, etc. VDFG 400*a* can be capable of delivering a plurality of VDFs to one or more output modules 356*a-c* (FIG. 3) involved in a video conference session.

VDFG 400*a* can include a communication and management module (CMM) 410, a VDF database (VDF-DB) 430, and a view description file engine (VDEF) 440. VDFG 400*a* can receive, via CMM 410, requests for generating a VDF and relevant information (parameters) such as a conference profile, for example. The conference profile can include templates of layouts to be used, the location of the windows (areas) of each conferee's video image in a composed CP video associated to the layout and to be generated by the MCU, what type of accessory elements are to be defined by the one or more VDFs, association between AAEs and the windows, etc. The conference profile can also define the number of VDFs that can be used during the session. For example, the number of VDFs can be varied between a plurality of VDFs, one per each conferee, or one VDF that will be distributed to all of the conferees or any combination between the two. An exemplary profile can also include information regarding the conferees, such as names, locations, etc. This information can be used for defining content of AAE to match events in the communication session. More information about management entities, conference profiles are disclosed in U.S. patent application Ser. Nos. 09/708,898; 09/790,577; 10/941,790; and 10/960,337 and in U.S. Pat. No. 6,760,750, the contents of which are incorporated herein by reference.

CMM 410 processes the received conference profiles and determines the number of VDFs needed for the session, for example, one VDF for each composite video to be built and delivered to relevant endpoints. A VDF can include instructions regarding the composition of the video images as well as instructions for creating and composing the accessory elements with the video images as well as association instructions. After defining the groups of VDFs, CMM 410 can allocate computing resources for creating the plurality of VDFs and storage resources in VDF data base (VDF-DB) 430.

View description file engine (VDEF) 440 can create the first VDF for output modules 356*a-c* (FIG. 3) and can modify an existing VDF. VDEF 440 can include a drawing engine operating in a similar way to VISIO, POWERPOINT, etc. adapted to handle association between content of AAE and content of other objects or events. Other embodiments may use a proprietary designing application. More information on an exemplary design process is disclosed below in conjunction with FIG. 6*a*. Each created VDF can be stored in VDF-DB 430 and can be accessed via a link (pointer), for example. In addition to storing ready-to-use VDFs, VDF-DB 430 can store a plurality of accessory elements that may be needed for creating a VDF. The VDF-DB 430 may store a plurality of profiles, background slides, template VDFs to be used by one or more organizations using the conferencing system, graphical information and icons used by the different type of endpoints, content, user's names etc. A template VDF can define a set of layer description files with areas for different objects and text. A template VDF can be adapted, edit, to a certain conference by the VDEF. An exemplary adaptation can be name tags of the current conferees. An exemplary template of VDF is illustrated by FIG. 1.

A VDF created and delivered to an output module 356*a-c* (FIG. 3) of an MCU may include one or more layer description files. The VDEF 440 can collect information required to create each of the layer description files included in a VDF. Such information may include the location of the top left corner and the size of each of the space holders (windows) allocated to a video image of conferees to be presented and where to retrieve the relevant decoded video data belonging to the relevant conferee. The information can be an input module 352*a-c* (FIG. 3) assigned to the conferee whose image will be displayed in the area. Alternatively, the VDEF may associate an area with a conferee ID number in the VDF and allow the MCU to match the input module 352*a-c* (FIG. 3) with its associated conferee. Additional information can be related to the accessory elements. Such information can include instruction regarding shape, sizes, location, fonts, association information, contents of AAEs, etc. After defining all of the areas, an end of VDF indication can be added to the layer description file. The layer description file is stored in the VDF-DB 430 in the location assigned to this VDF. An indication that an updated VDF is ready can be delivered to the relevant output module.

After collecting the required information, an appropriate template VDF can be retrieved from the VDF-DB 430. The retrieved template VDF can be modified by the VDEF 440 according to the needs of the current conference. Exemplary modification of the template VDF can include adding association information, writing the appropriate links (i.e., pointers to the appropriate background slide 110, the next layer description file, association information between AAE 134*a-c* and the content of windows 122*a-c* (FIG. 1), respectively. The modified template VDF can be stored in the VDF-DB 430 with its assigned pointer. An indication that an updated VDF is ready can then be delivered to the associated destination.

In addition, an exemplary VDEF 440 can be capable of preparing a template VDF. The VDEF 440 can include a drawing (design) application such as modified VISIO, POWERPOINT, etc. or a proprietary drawing application. The VDF can include instructions to compose the video images of the presented conferees as well as instructions to create the accessory elements and compose them with the video to build the composite video to be sent to the relevant endpoint, as described above in conjunction with a relevant VDF. In some embodiments, the VDF includes the information needed to compose the composite video and may not use links to accessory elements.

In case that VDFG 400*a* is not embedded within the MCU, communication between the VDFG 400*a* and the MCUs can be via a packet-based network such as a LAN, Internet, Intranet, etc. or any other type of network used for communication between computers. A signaling and control connection can be set between the CMM 410 and each one of the entities involved in the session. Each signaling and control connection can carry control information such an indication of an updated ready-to-use VDF with its pointer. Such indication can be sent from CMM 410 toward an MCU. In some embodiments an indication can be used for indicating a new event occurring during the session and requiring an update of one or more VDFs. On receiving such an update indication (i.e., a VDF ready message) with a pointer, an MCU can retrieve the updated VDF from the VDF-DB 430 using the received pointer.

Still alternatively, the VDFG 400*a* can be a section of the control module 340 (FIG. 3) of the MCU 300 (FIG. 3), and communication with one or more management servers can be via an IP network via NI 310 or directly by the CMM 410 and can communicate with other sections of the MCU and with the output modules 356*a-c* (FIG. 3) via one or more internal buses of the MCU.

A plurality of VDEFs 440 can be used to create a plurality of VDFs in parallel using a plurality of modules. More information on the operation of VDFG 400*a* is provided below in conjunction with FIG. 6*b*.

Figure 4B:
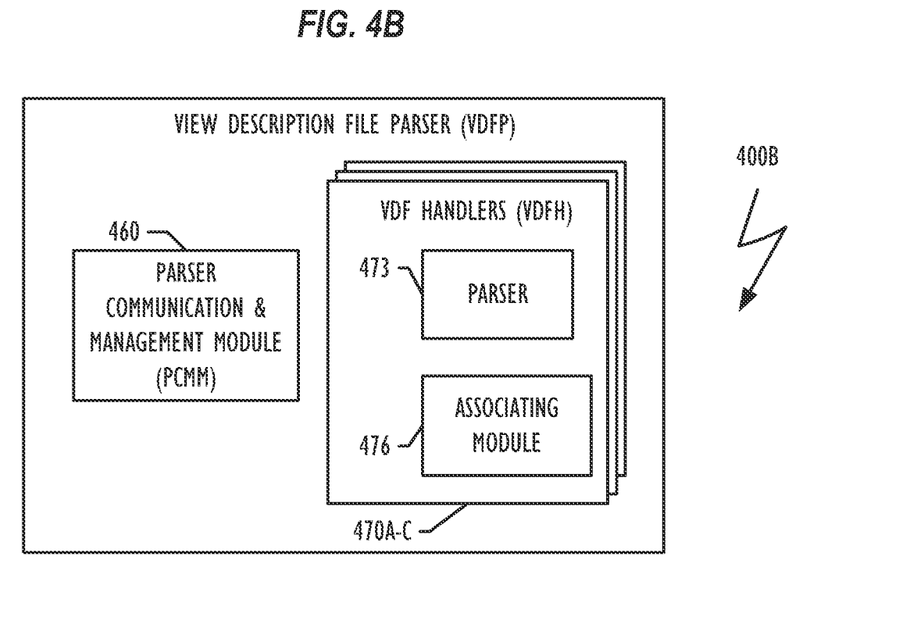
FIG. 4b is a block diagram illustrating elements of an exemplary VDF Parser (VDFP)

FIG. 4*b* illustrates elements of a VDF Parser (VDFP) 400*b*. A VDFP 400*b* can be embedded within an MCU as a section of a control module 340, as illustrated in FIG. 3. VDFP 400*b* includes a parser communication and management module (PCMM) 460 and a plurality of VDF handler modules (VDFH) 470*a-c*. Each VDFH can be associated with a VDF and can serve an active output module 356*a-c* (FIG. 3). Alternatively, VDFP 400*b* can be embedded within an output module. Such embodiment of VDFP 400*b* may include a single VDFH 470 in an output module. VDFP 400*b* can get a plurality of pointers from VDFG 400*a* via PCMM 460. Each pointer can point to an updated ready-to-use VDF associated with an active output module 356. For each new pointer, resources are allocated and a new VDFH 470*a-c* process is initiated for handling the relevant VDF. The pointer is then transferred to the new VDFH 470 for further processing.

VDFH 470*a-c* can include a parser 473 and an association module 476. Association module 476 can be used for receiving association information created by VDFG 400*a* and sent as part of the VDF, parsed by the parser, and delivered to the association module 476. The association information is processed by the association module. Accordingly, input modules 352*a-c* (FIG. 3) are defined as the source of decoded video to be placed in relevant windows. Appropriate content (conferee's name, for example) are retrieved from VDF-DB 430 and be embedded within the appropriate AAE. The processed information is delivered to the image builder within the relevant output module 356*a-c* (FIG. 3). This information is used to synchronize the images, names and event in the session.

Parser 473 can perform tasks relevant to processing the received VDF that describe the complete video image including all the accessory elements and the composite video as illustrated by phase 230 (FIG. 2). Furthermore, the parser 473 can be adapted to retrieve information that is embedded within the VDF and per each layer to create a set of instructions to the builder that is embedded in the output module.

While parsing the first layer description file, parser 473 may parse the name of the background slide 110 (FIG. 1) and retrieve it from VDF-DB 430. Alternatively the background slide could be associated with the received VDF. The background slide can be processed according to its file format and converted into pixel data to be stored in a 1st-layer-frame-memory, which is associated with the $1^{st}$ layer, according to pixel addresses. The 1st-layer-frame-memory can be transferred to the relevant output module 356*a-c* (FIG. 3) to be used by the image builder. Parsing the first layer description file can continue and the next layer description can be accessed.

The second layer in the example of FIG. 1 includes information about the location and the size of the presented conferees' video images as well as visual effects. Parser 473 can determine the size and the location in the screen of each presented conferee's video image and the relevant ID of the conferees. The information related to the location, size, visual effects and conferee's ID is transferred to the image builder at the relevant output module 356*a-c* (FIG. 3) via PCMM 460. Based on this information the relevant image builder can be set to retrieve decoded video data from the appropriate input modules 352*a-c* (FIG. 3), scale it to the appropriate size, and place the scaled decoded video in the appropriate location in the frame memory above the first layer. Parsing the second layer can continue and then the third layer (the top one) description can be accessed.

An example third layer description 130 is illustrated in FIG. 1. The third layer includes three frames 132*a-c* and three text areas 134*a-c*. During parsing the third layer each accessory element is accessed. Each accessory element is retrieved and processed. The retrieved object can include a set of parameters (size, thickness, color, text parameters and coordinates, for example). The parser can be initiated to create pixel data based on the set of parameters and store the pixel data in a top-layer-frame-memory associated with the top layer, according to pixel addresses. After processing the last pixel of the first border lines 132*a* the parser 473 continues parsing the third layer description. Parsing the third layer description file can continue and parser 473 can reach the second border lines 132*b* and process the link in a similar procedure as the first. After handling the second border lines 132*b*, parser 473 can continue to the third accessory and so on. In the case that the accessory element is an AAE, the relevant content is retrieved (conferee's name, information coming from the associated endpoint, etc.) and placed in the AAE. Pixel addresses in the top-layer-frame-memory that are not associated with an accessory element can be marked as transparent pixel. The top-layer-frame-memory can be transferred to the image builder at the relevant output module 356*a-c* (FIG. 3). Parsing the description file can continue until the end of the VDF is reached. After handling the VDF, VDFH 400*b* can go into an idle stage until it receives an indication that an updated VDF is received.

FIG. 5 illustrates relevant elements of an exemplary output module-image builder (OMIB) 500 embedded within an exemplary output module 356*a-c* (FIG. 3) between the common interface 354 (FIG. 3) and the encoder of the output module. An exemplary OMIB 500 can repetitively build the next output frame memory to be encoded and transferred toward an associated endpoint. OMIB 500 can include one or more frame memories of non-video layers (FMNVL) 510*a-c*, one or more frame memories of decoded video of presented conferees (FMDVPC) 520*a-c*, an image builder engine (IBE) 530, and a next image builder frame memory (NIBFM) 540. Each FMNVL 510*a-c* is a frame memory used for one of the layers that does not include video data such as layers 110 and 130 (FIG. 1). Each FMNVL 510*a-c* can be written by parser 473 (FIG. 4) during parsing an updated VDF as disclosed above. The FMNVL 510 of the top layer 130 contains the associated content of the AAEs 134*a-c*. Each FMPVPC 520*a-c* stores a current received decoded video frame from a presented conferee's input module 352*a-c* (FIG. 3).

IBE 530 can run in a loop as long as a session is active. Each cycle can be initiated according to the frame rate used by the associated endpoint. At the beginning of a cycle a NIBFM 540 is allocated. The FMNVL 510 that is associated to the first layer, i.e., the bottom layer, is copied to the NIBFM 540 respectively to pixels addresses. At the end of the coping process the data in NIBFM 540 looks like snapshot 210 (FIG. 2).

During the second stage, i.e., of preparing the exemplary snapshot 220 (FIG. 2), IBE 530 can retrieve decoded video data from the appropriate FMPCDVs 520*a-c*, scale the video to the appropriate size, and place the scaled decoded video in the appropriate location in the NIBFM 540 above the data of the first layer. Handling the video images is based on the instructions parsed by parser 473 (FIG. 4*b*) during parsing the second layer. In another exemplary embodiment, scaling can be implemented by the input module 352*a-c* (FIG. 3) before transferring the decoded video toward the FMPCDV 520*a-c*.

After placing the last video image at NIBFM 540, the third and last layer is processed by IBE 530 from the FMNVL 510 that stores the data of the third layer, including the content of AAEs (134*a-c* FIG. 1) to fill the next frame memory with data of a composite video. The top layer frame memory 510 can be accessed pixel-by-pixel by the IBE 530 and the data of the pixel (if it is not marked as transparent) can be written instead of or mixed with the value that was previously written in the respectively pixel address in NIBFM 540. At the end of coping information from the top-layer-frame-memory 510, the NIBFM 540 is ready for encoding by the encoder of the output module and transfer toward the relevant endpoint. The composite video created looks like snapshot 230 (FIG. 2). IBE 530 can then start composing the next frame of the composite video.

Figure 6A:
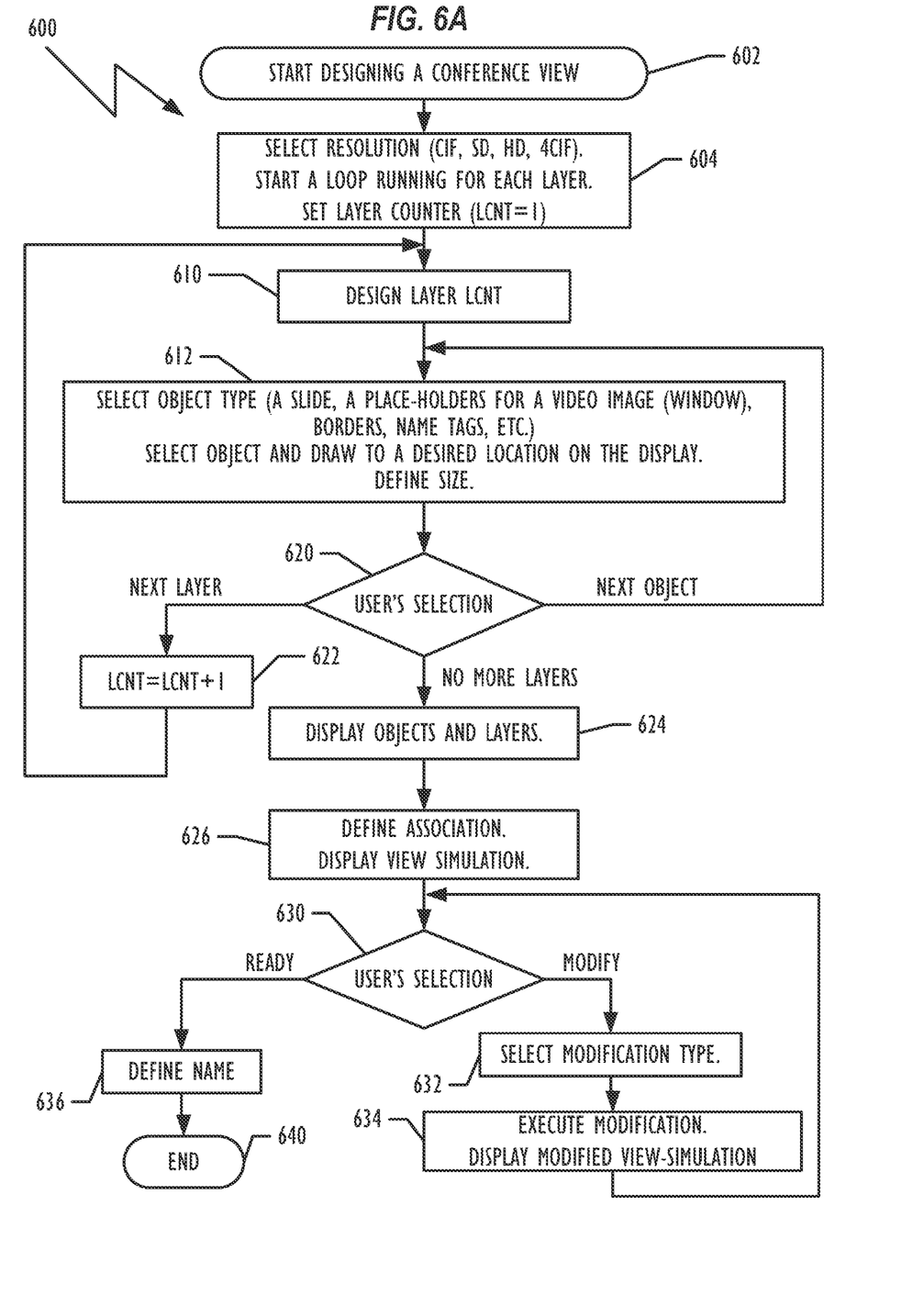
FIG. 6a is a flow diagram illustrating steps of designing a conference view.

FIG. 6*a* illustrates the flow of an exemplary design process 600 of a conference view. An exemplary design application may have a GUI (graphical user interface) that appears on the screen of a user's computer and prompts the user to act. An exemplary main menu allows the user to select a design option. Exemplary design options can include designing a new view, modifying an existing view, creating a new template, etc. The process can be executed on any computing device, which includes an exemplary VDFG 400*a* module (FIG. 4*a*), such as a personal computer, a video conferencing terminal, etc. Upon selecting the design a new view option 602, the user is prompted to select 604 the desirable resolution. Exemplary resolutions can be CIF (352×288), SD (Standard Definition, 720×576), HD 720p (High Definition), etc. In some embodiments, the designer can define any preferred resolution. A layer counter (LCNT) is set to one for counting the layers.

In response, a rectangle (view-simulation) in the proportions of the selected resolution appears on the screen of the computer with a menu offering the user different design options and prompting the user 610 to design the first layer. The user can define 612 a type for each element (object) in the layer. The type can be a background slide, a window for a video image (a space holder), a name tag, a text box, etc. According to the object type, a sub-menu can offer the user several options. For example selecting "background slide" may cause the program to offer a list of slides, an option to add a new slide, create a new slide, etc. A name tag or a text box can be followed by options allowing the user to define background color, font type, size and shape, etc. The selected object can be drawn to the view-simulation, placed in the desired location and sized to the desired size.

After handling the first object in the first layer, the user is prompted to select 620 one of the following options: next-object, next-layer, and no-more-layers, for example. If 620 the next-object is selected, then the user is prompted 612 to select the next object. If 620 the next-layer is selected, then the LCNT is incremented 622 and the user is prompted 610 to design the next layer. If 620 "no-more-layers" is selected, then the design-application processes the drawing and displays a view simulation 624 with the layers and the objects. The user is requested 626 to define associations between elements. After defining the associations, the view simulation is displayed 626 with all the elements in the appropriate level and the associations between AAE. In some embodiments, the association step 626 can be implemented per object after drawing the object during executing step 612, for example. Alternatively or additionally associating the objects can be done by assigning a number to each object and creating one or more clusters of objects. In a cluster all the objects are associated. The design program may process the information for each cluster and may create the association lines 135*a-c* (FIG. 1).

After displaying the view-simulation 624 the user is prompted to select one of the two options: "modify" or "ready." If 630 "modify" is selected, the user is prompted 632 to select the type of modification. Different types of modifications can include changing the resolution, changing the font, changing a layer, changing an association, etc. According to the user decision, the modification is executed 634 and the modified view-simulation is processed and displayed. The user is prompted again 630 to select an option. If 630 the user selects the "ready" option, then the user is prompted to name 636 the designed conference-view. After naming, the design process is terminated and the design-application starts processing the design in order to create a VDF.

Figure 6B:
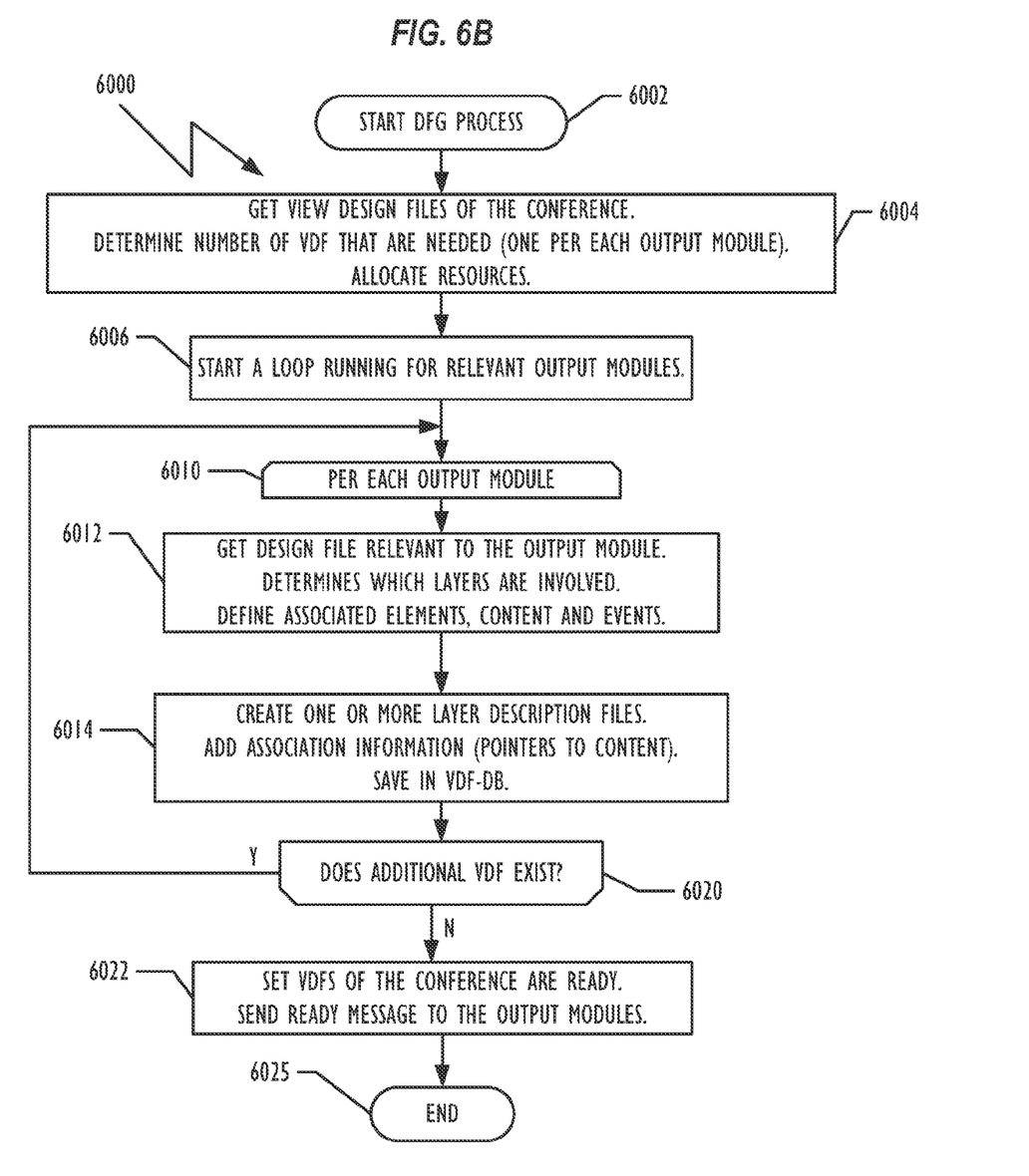
FIG. 6b is a flowchart illustrating steps of an exemplary process of an VDF Generator.

FIG. 6*b* illustrates a process 6000 executed by View Description File Generator (VDFG) after the end of the design process 600. Method 6000 can be implemented by a VDFG 400*a* (FIG. 4*a*) using a loop for creating a plurality of VDFs, one per each output module that is associated with the conference. Process 6000 can be initiated 6002 by the CMM 410 (FIG. 4*a*) on receiving a request to start a new video session and will run as long as the associated new session is active. Each video session can be managed by a similar process conducted by the VDFG.

Depending on the configuration and architecture of the conferencing system, the request for a new session or a change in a session can be received from control module 340 (FIG. 3) or a management server or a design application running on a personal computer, or terminal of a conferee. Upon its initiation, one or more conference parameters are guttered 6004. Parameters may include designs of one or more views, names of current conferees and their ID numbers, endpoint addresses, etc. Based on the conference parameters, the number of associated output modules and VDFs needed for the session is calculated 6004. A session may require multiple sets of output modules and VDFs, for example, a set for each composite video to be built and delivered to one or more endpoints. Storage resources are allocated 6004 for each VDF at VDF-DB 430 (FIG. 4*a*). After preparing to create the VDFs, a loop can be started 6006 running for all relevant output modules. A cycle can be started 6010 per each output module associated with the conference.

At step 6012 information related to the currently handled output module is sorted from the information gathered during process 6004. Relevant information can includes the appropriate design file that was created by process 600, background slide, graphical information, icons, etc. used by a targeted endpoint of the current output module, as well as content to be used, names of conferees that will be presented on the screen of the endpoint, association information, pointers in VDF-DB 430 (FIG. 4*a*) associated to the current VDF, etc.

Based on the information relevant to the current VDF, the number of layer description files embedded within the VDF is defined 6012. Association parameters between content of AAEs (134*a-c* and 122*a-c*, FIG. 1) can be defined. The association information can associate a pointer to content of an AAE 134*a-c* (name of a conferee, for example) and an association matrix which defines the relations (connections) between the endpoints, input modules, windows 122*a-c*, relevant AAE and the location (pointers) from where to collect relevant data. For example, selecting decoded video coming from a certain input module 352*a-c* (FIG. 3), which is assigned to decode received video image from the conferee that will be presented in the associated window 122*a-c*. The AAEs can be located in different layers. Storage resources can be allocated to each of the layer description files.

After collecting the information relevant to the current VDF, the collected information and association information is transferred to a description file engine (VDEF) 440 (FIG. 4*a*) that is part of the VDFG 400*a*. The VDEF processes 6014 the collected information and the association information as disclosed above in conjunction with FIG. 4*a*. At the end of process 6014 the VDEF delivers one or more layer description files that compose the current handled VDF. The layer description files are stored in the VDF-DB 430 in the appropriate location. An exemplary VDEF can be adapted to create a file according to the protocol used by VDFG 400*a*, VDFP 400*b* and the output module 356*a-c*. This protocol defines information and processes needed for implementing a VDF. For example, the protocol can define fields that are allocated to the association information, the chained number of layer description files that compose the VDF, etc.

After storing the VDF in the appropriate location at VDF-DB 430 (FIG. 4*a*), a decision is made 6020 whether additional VDF has to be handled. If yes, method 6000 returns to step 6010 and runs the loop for the next VDF. If there are no additional VDFs, then a flag indicating that the VDFs of the session are ready to be delivered/requested is set 6022. A ready message can be sent to the control module 340 (FIG. 3) of the MCU, to the relevant output modules and/or to VDFP 400*b* (FIG. 4*b*). The ready message can indicate that a ready to use set of VDFs of the session is ready and can be retrieved by the relevant output modules and/or to VDFP 400*b*. An exemplary ready message can include information on the relevant ready-to-use VDFs and a list of pointers from where the associated VDFs can be retrieved. After sending the message, method 6000 may terminate 6025.

Figure 7:
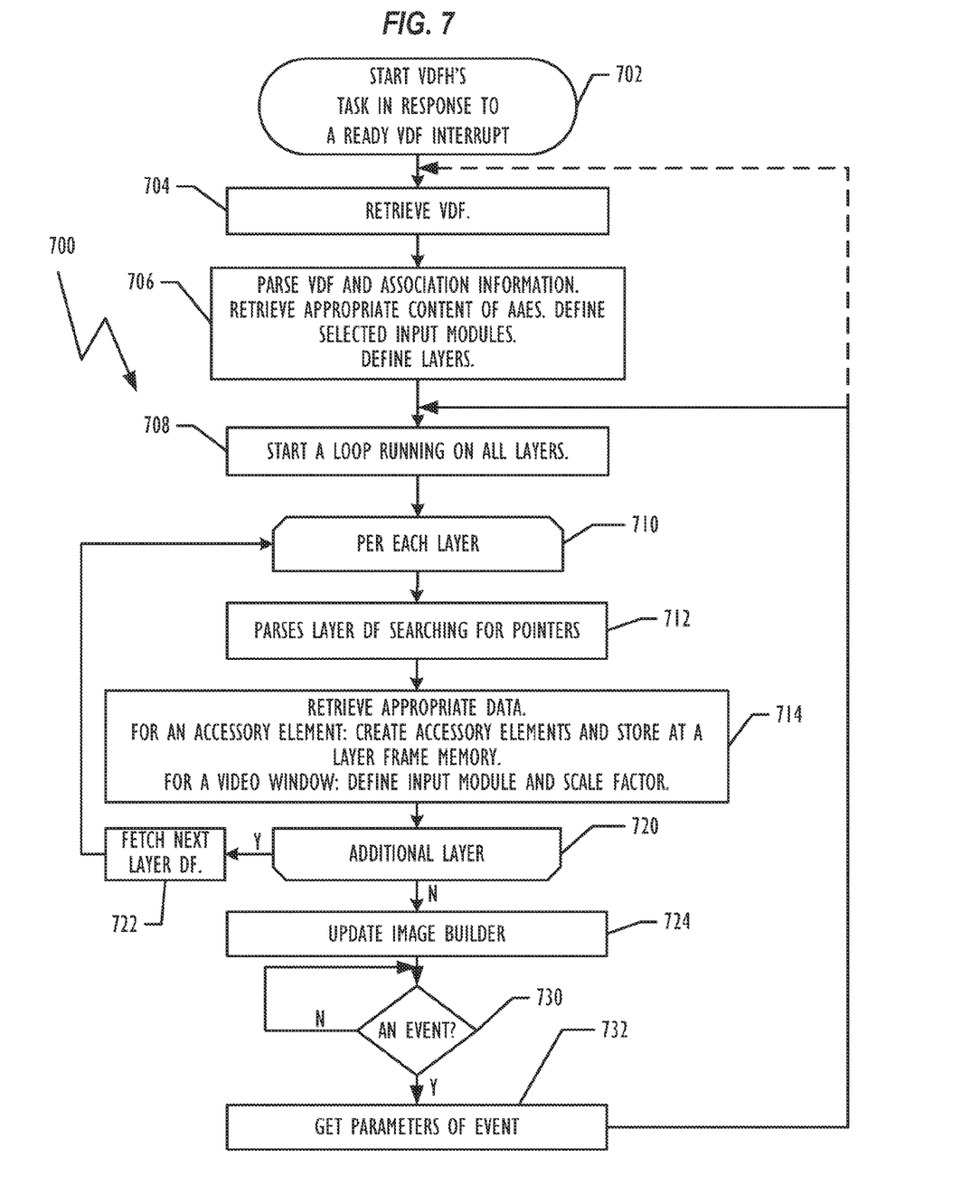
FIG. 7 is a flowchart illustrating steps of an exemplary view related process of an MCU.

FIG. 7 illustrates a process 700 for handling a VDF, which is related to an output module. Process 700 can be implemented by VDFH 470 (FIG. 4*b*). Process 700 can be initiated 702 on receiving an indication that a relevant VDF is ready at VDF-DB 430 (FIG. 4*a*). The indication can include a pointer to the VDF. The VDF is fetched 704 and parsed by parser 473 (FIG. 4*b*). Information regarding the content of AAEs, input modules, number of layers is defined 706. Then a loop is initiated 708 executed, from step 710 to 720, for all the layers that are embedded within the VDF.

For the example of FIGS. 1 and 2, the loop can have three cycles. The first layer description file is parsed 712. Each pointer, at its turn, is fetched, executed and stored at a first-layer-frame-memory. During parsing the first layer description file, a pointer to the background slide 210 (FIG. 2) can be accessed. The background slide can be fetched 724 based on the pointer, from VDF-DB 430 (FIG. 4*a*) and stored in the first layer frame memory 510 (FIG. 5). Parsing the first layer description file can continue and a pointer the next layer description file can be found 720.

The next layer description file can be fetched 722 from VDF-DB 430 (FIG. 4*a*) and method 700 can return to step 710 and start the next cycle in the loop. In this cycle the second layer (i.e., 120 in FIG. 1) can be parsed 712. Parser 473 (FIG. 4*b*) can access pointers to each object, 122*a-c* (FIG. 1). Each object can be fetched 724, based on the pointer, from VDF-DB 430 (FIG. 4*a*) executed and Parser 473 can determine the size and the location in the screen per each presented conferee's video image and the relevant ID of the conferees. The information related to the location, size, visual effects, and conferee's ID is transferred to the relevant image builder 530 (FIG. 5). Based on this information the relevant image builder can be set to retrieve decoded video data from the appropriate input modules 352*a-c* (FIG. 3) store the data at FMPCDV 520*a-c* (FIG. 5), scale each image to the appropriate size, and place the scaled decoded video in the appropriate location in the frame memory above the first layer. Parsing the second layer description file can continue and a pointer to the next layer description file can be found 720.

The next (i.e., 130 in FIG. 1) layer description file can be fetched 722 from VDF-DB 430 (FIG. 4*a*). After fetching the third layer description file, the next and the final loop can be started 710. During parsing 712 the third layer description file the VDFH 470 (FIG. 4*b*) may access pointers to accessory elements of the third layer as borders 132*a-c* and three text areas 134*a-c*. During parsing the third layer each accessory element is retrieved and be processed. The retrieved object can include a set of parameters (size, thickness, color, text and coordinates, for example). A software code can be initiated to create pixel data based on the set of parameters and stores the pixel data in FMNVL of the top-layer 510*a-c* (FIG. 5), which is associated with the top layer, according to pixel addresses. After processing the last pixel of the first border lines 132*a* the software code can instruct parser 473 to continue parsing the third layer description and the software code can be terminated. Parsing the third layer description file can continue and parser 473 can reach the second border lines 132*b* and process the link in a similar procedure as the first one. After handling the second border lines 132*b* parser 473 can continue to the third accessory and so on. In case that the accessory element is an AAE (such as elements 134*a-c*/122*a-c*, FIG. 1), the relevant content, according to the association matrix, is retrieved (conferee's name, for example) and be placed in the AAE. Parsing the description file can continue and the end of VDF indication can be reached indicating that there are no additional layers 720 (in this example). The image builder 500 (FIG. 5) at the output module is updated 724 with the new parsed information and method 700 can wait 730 for an event to occur, such as for a new speaker to be selected, an additional conferee to join the session, a conferee to leave the session, etc.

If 730 an indication of an event is received, then information related to the change is gathered 732. Such information may be names of new conferees and their ID numbers, the name of a new speaker, addresses of new endpoints, etc. Based on the information collected, VDFH 470*a-c* (FIG. 4*b*) may repeat steps 708 or to 724. The modification can be minor such as changing the speaker (returns to step 708); or major such as replacing the template VDF when additional conferees join the session, requiring that the number of presented conferees be increased from 2×2 to 3×3, for example. In such a major change method 700 may return to step 704 and an appropriate VDF can be retrieved. Resources can be allocated or released according to the changes, after which method 700 may continue from step 708 or 704 (depending on the change).

In the present disclosure, the words "unit," "element," "module" and "logical module" can be used interchangeably. Anything designated as a unit or module can be a stand-alone unit or a specialized or integrated module. A unit or a module can be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods can be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A method of composing a videoconferencing view of a videoconference, comprising:
   accepting a custom-composed view design file that specifies the location and content of objects within the videoconferencing view, wherein at least one of the objects is an accessory element;
   parsing the view design file;
   arranging the objects at the specified location within the view;
   populating the objects with the specified content; and
   synchronizing the content of the accessory element with an event in the videoconference.

2. The method of claim 1, wherein at least one of the objects is a place holder for video images of a presented conferee.

3. The method of claim 1, wherein content of the accessory element depends on the event in the videoconference.

4. The method of claim 1, wherein content of the accessory element depends on content of another object in the view.

5. The method of claim 4, further comprising synchronizing the accessory element and the another object in the view.

6. The method of claim 1, wherein the accessory element is selected from a group consisting of text related to a conferee image in the composed view, icons, and border lines.

7. The method of claim 1, wherein the view is composed of stacked levels, and wherein the view design file defines levels of the objects to be displayed in the video.

8. The method of claim 1, wherein the view design file comprises two or more files, each file corresponding to a layer in the video.

9. The method of claim 1, wherein the view design file is designed using a drawing program.

10. The method of claim 9, wherein the drawing program is capable of drawing one or more objects, defining the content of the objects, defining a spatial arrangement of the objects within the view, and defining association between content of objects.

11. A method of presenting a custom-composed view in a videoconference, comprising:
   designing the view in a drawing program by drawing one or more objects, defining the content of the objects, and defining a spatial arrangement of the objects within the view, and wherein at least one of the objects is an accessory element;
   generating a view description file for the view; and
   wherein the view description file is executed in a videoconferencing entity that is capable of parsing the view description file, arranging the objects in the spatial arrangement within the view; populating the objects with the defined content; and synchronizing the content of the accessory element with an event in the videoconference.

12. The method of claim 11, wherein one or more of the objects is a place holder for video images of a presented conferee.

13. The method of claim 11, wherein content of the accessory element depends on the event in the videoconference.

14. The method of claim 11, wherein content of the accessory element depends on content of another object in the view.

15. The method of claim 11, wherein the view is composed of stacked levels, and wherein the view description file defines levels of the objects to be displayed in the video.

16. The method of claim 11, wherein the view description file comprises two or more files, each file corresponding to a layer in the view.

17. The method of claim 11 wherein the videoconferencing entity is a multipoint control unit.

18. A videoconferencing apparatus for composing a view in a multipoint videoconference, comprising:
   a communications module adapted to accept an externally designed design file specifying the position and content of objects to be displayed in the view, wherein at least one of the objects is an accessory element;
   a parser adapted to parse the design file to generate a view description file effective to instruct a view-building module for building a view;
   a view-building module adapted to construct the objects specified by the view description file and place the objects in the specified positions within the view;
   an associating module adapted to populate the object with the specified content and to synchronize the content of the accessory element with an event in the videoconference; and
   an output module adapted to send the view toward a display unit of an endpoint.

19. The videoconferencing apparatus of claim 18, wherein one or more of the objects is a place holder for video images of a presented conferee.

20. The videoconferencing apparatus of claim 18, wherein content of the accessory element depends on the event in the videoconference.

21. The videoconferencing apparatus of claim 18, wherein content of the accessory element depends on content of another object in the view.

22. The videoconferencing apparatus of claim 18 wherein the view is composed of stacked levels and wherein the view description file defines levels of the objects to be displayed in the video.

23. The videoconferencing apparatus of claim 18, wherein the view description file comprises two or more files, each file corresponding to a layer in the video.

* * * * *